United States Patent
Hsiao et al.

[11] Patent Number: 5,754,185
[45] Date of Patent: May 19, 1998

[54] APPARATUS FOR BLENDING PIXELS OF A SOURCE OBJECT AND DESTINATION PLANE

[75] Inventors: Jan-Han Hsiao; Wei-Kuo Chia, both of Hsinchu; Chun-Kai Huang, Taichung, all of Taiwan

[73] Assignee: Industrial Technology Research Institute, Hsinchu, Taiwan

[21] Appl. No.: 598,520

[22] Filed: Feb. 8, 1996

[51] Int. Cl.$^6$ ................................................. G06T 11/00
[52] U.S. Cl. ................................................. 345/431
[58] Field of Search ........................... 395/131, 130, 395/133, 134, 135, 501, 523, 524, 525, 526; 345/186, 200

[56] References Cited

U.S. PATENT DOCUMENTS

| | | | |
|---|---|---|---|
| 5,046,023 | 9/1991 | Katsura et al. | 395/134 |
| 5,185,856 | 2/1993 | Alcorn et al. | 395/130 |
| 5,222,205 | 6/1993 | Larson et al. | 395/130 |
| 5,268,681 | 12/1993 | Lin et al. | 345/200 |
| 5,268,682 | 12/1993 | Yang et al. | 345/200 |
| 5,321,425 | 6/1994 | Chia et al. | 345/200 |
| 5,422,657 | 6/1995 | Wang et al. | 345/186 |
| 5,594,854 | 1/1997 | Baldwin et al. | 395/501 X |

OTHER PUBLICATIONS

L. Williams, *Pyramidal Parametrics*, Computer Graphics, vol. 17, No. 3, pp. 1–11, Jul., 1983.
W. Newman & R. Sproull, Principles of Interactive Computer Graphics, ch. 25, pp. 389–410 (1979).

*Primary Examiner*—Almis R. Jankus
*Attorney, Agent, or Firm*—Meltzer, Lippe, Goldstein, Wolf & Schlissel, P.C.

[57] ABSTRACT

An apparatus and method for blending pixels of a source object and a destination plane of view of 3-D space. The source object overlaps the destination plane of view. Furthermore, the 3-D space may contain an atmospheric light diffusion, i.e., fog or smoke, which produces a "fog effect." The apparatus includes multiplexer circuitry which receives first, second, third, fourth and fifth control signals. The multiplexer circuitry also receives a fog blend factor, a source alpha, a destination alpha, a source color, a destination color, a fog color and one. In response to the control signals, the multiplexer circuitry selects three outputs. In particular, in response to the first, second and third control signals, the multiplexer selects as the first output, either: the destination alpha, the source alpha, the fog blend factor, one, the destination color, or one minus one of the aforementioned choices. In response to the first, fourth and fifth control signals, the multiplexer circuitry selects as the second output either: the destination alpha, the source alpha, the fog blend factor, one, the source color, or one minus one of the aforementioned choices. In response to the first control signal, the multiplexer circuitry selects as the third output the destination color or the fog color. The apparatus also includes calculation circuitry which produces a first product, of the source color and the first output of the multiplexer circuitry, produces a second product of the second and third outputs of the multiplexer circuitry, and thereafter adds the two products together.

16 Claims, 3 Drawing Sheets

APPARATUS FOR BLENDING PIXELS OF A SOURCE OBJECT AND DESTINATION PLANE

RELATED APPLICATION

The following patents and patent applications are commonly assigned to the assignee of this application and contain subject matter related to this application:

1. U.S. patent application Ser. No. 08/598,523, entitled, "Rip Map/Mip Map Textured Address Generator," filed for Ruen-Rone Lee, Chun-Kai Huang and Wei-Kuo Chia on even date herewith;
2. U.S. patent application Ser. No. 08/598,521, entitled "Texture Filter Apparatus for Computer Graphics System," filed for Yu-Ming Lin, Chun-Kai Huang, Wei-Kuo Chia on even date herewith;
3. patent application Ser. No. 08/598,522, entitled, "Virtual Coordinate To Linear Physical Memory Address Converter For Computer Graphics System," filed for Erh-Chia Wang, Wei-Kuo Chia, and Chun-Yang Cheng on even date herewith;
4. U.S. Pat. No. 5,422,657, entitled, "A Graphics Memory Architecture for Multi-mode Display System," filed for Shu-Wei Wang, Wei-Kuo Chia, Chun-Kai Huang and Chun-Chie Hsiao on Sep. 13, 1993;
5. U.S. Pat. No. 5,321,425, entitled, "Resolution Independent Screen Refresh Strategy," filed for Wei-Kuo Chia, Jiunn-Min Jue, Gen-Hong Chen and Chih-Yuan Liu on Feb. 19, 1992;
6. U.S. Pat. No. 5,268,682, entitled, "Resolution Independent Raster Display System," filed for Wen-Jann Yang, Chih-Yuan Liu and Bor-Chuan Kuo on Oct. 7, 1991; and
7. U.S. Pat. No. 5,268,681, entitled, "Memory Architecture With Graphics generator Including A Divide By Five Divider," filed for Cheun-Song Lin, Bor-Chuan Kuo and Rong-Chung Chen on Oct. 7, 1991.

The contents of the above-listed patents and patent applications are incorporated herein by reference.

FIELD OF THE INVENTION

The present invention relates to computer graphics systems. In particular, the present invention relates to three-dimensional (3-D) rendering of objects which have properties of texture, patterns or translucence in 3-D space. The invention is also applicable where the 3-D space in which the objects are rendered has a "gaseous" or "atmospheric" light diffusion effect, such as a fog, which may partly obscure objects.

BACKGROUND OF THE INVENTION

FIG. 1 depicts a conventional computer system 10. The computer system 10 has a processor 12, a main memory 14, a disk memory 16 and an input device 18, such as a keyboard and mouse. The devices 12–18 are connected to a bus 20 which transfers data, i.e., instructions and information, between each of these devices 12–18 A graphics processor 30 is also connected to the bus 20. As shown, the graphics processor 30 includes a drawing processor 32. The drawing processor 32 is also connected to a frame buffer 34. The frame buffer 34 is connected to a display device 38, such as a cathode ray tube (CRT) or liquid crystal display (LCD) monitor.

The drawing processor 32 receives instructions from the processor 12 for drawing objects. For instance, in the case of a computer aided design (CAD) application, the processor 12 may receiver user input regarding creating and locating objects in 3-D space. The processor 12, in turn, transfers instructions regarding the size, location, texture, translucence, etc. of such objects to the drawing processor 32. In response, the drawing processor 32 creates a pixel image representation of a plane of view of such objects in 3-D space. The pixels of the image of each plane of view form part of a frame that is stored by the drawing processor 32 in the frame buffer 34. Several drawing processors 32 are known, such as is disclosed in U.S. Pat. Nos. 5,046,023 and 5,185,856. The latter reference discloses a drawing processor that is specifically adapted for rendering 3-D objects.

As shown in FIG. 1, the drawing processor 32 may be connected to a special purpose arithmetic logic unit (ALU) 36 which assists in rendering 3-D objects in a particular plane of view. For instance, the image of each object may be separately drawn and maintained in memory. Each object image may be stored as RGBA pixel data. That is, each pixel of each object image may comprise a color intensity for each of the primary colors red (R), green (G) and blue (B) and data regarding the pattern, texture or transparency of the pixel alpha (A). The drawing processor 32 then uses the ALU 36 to combine the source objects into a destination plane of view, e.g., one source object at a time. In combining each source object, the ALU 36 "blends" the pixels of the destination plane of view with a source object. For instance, consider the case that a source object is a glass pane that transmits 80% of incident light. The pixels of such an object may be represented by appropriate color intensities RGB and an A value of 20%. If such an object is placed in the destination view such that it is gin front of other objects, then the pixels which are overlapped by the glass pane should have a blended color formed from 80% of their original color and 20% of the glass pane source object's color. Stated another way, the new RGBA values Rd',Gd',Bd',Ad' of the overlapped destination pixels should be blended by the following formulas:

$$Rd'=Rs \cdot SBFr+Rd \cdot DBFr \qquad (1a)$$

$$Gd'=Gs \cdot SBFg+Gd \cdot DBFg \qquad (1b)$$

$$Bd'=Bs \cdot SBFb+Bd \cdot DBFb \qquad (1c)$$

$$Ad'=As \cdot SBFa+Ad \cdot DBFa \qquad (1d)$$

where Rs, Gs, Bs, As are the source RGBA values, Rd, Gd, Bd, Ad are the current destination RGBA values, SBFr, SBFg, SBFb, SBFa are source blend factors for Rs, Gs, Bs and As, respectively, and DBFr, DBFg, DBFb, DBFa are the destination blend factors for Rd, Gd, Bd and Ad, respectively. In this case, SBFr, SBFg, SBFb and SBFa may all be set to As=0.2, and DBFr, DBFg, DBFb and DBFa may all be set to 1−As=0.8.

The ALU 36 achieves such blending. FIG. 2 shows a conventional architecture of a "slice" of the ALU 36 (as described in U.S. Pat. No. 5,185,856) in greater detail. Illustratively, the ALU 36 has four similar slices, one for determining Rd', one for determining Gd', one for determining Bd' and one for determining Ad'. Illustratively, the Rd' slice is illustrated in FIG. 2. As shown, Rs is inputted on line 41, Rd on line 42 and alpha/pattern data is inputted on line 43. The alpha data inputted on line 42 may be stored in a register 44. In addition, blending data may be inputted by the processor 12 into a second register 45. The drawing processor 32 (FIG. 1) outputs a control signal to a multiplexer 46 which selects the alpha/pattern data inputted on line 43, stored in register 44 or register 45. The selected alpha/ pattern data M is inputted to a subtractor 47 which outputs 1–M. The selected alpha/pattern value M and 1–M are inputted to a complement circuit 48. The complemented values M' and (1–M)' are then inputted to multipliers 51, 52, respectively. In addition, Rs is inputted to multiplier 51 and Rd is inputted to multiplier 52. Multiplier 51 thereby produces the product Rs·M' and multiplier 52 produces the product Rd·(1–M)'. The product Rs·M' is outputted to a multiplexer 53 and the product Rd·(1–M)' is outputted to a multiplexer 54. Multiplexer 53 also receives the value Rs from line 41. Multiplexer 54 receives the value Rd via line 42 and the value Rs via register 49 (which is also connected to line 41). The values selected by multiplexers 53 and 54 are inputted to a 10-bit adder 55. The adder 55 adds the two values inputted thereto. In so adding, a carry out bit (CO) may be generated. For instance, suppose each of the R, G, B, and A values is eight bits. If the sum produced by the adder 55 has nine or more bits, then a carry out bit is generated. The sum and carry out bit are received at a saturation control circuit 56. The saturation control circuit has a multiplexer 57 that receives the carry out bit as a control signal. The multiplexer 57 receives the sum as a first selectable input and a maximum threshold value as a second selectable input. For instance, in the case of eight bit data, the maximum threshold is 255. If the carry is logic '0', then the sum produced by the adder 55 is less than or equal to 255. In such a case, the sum is outputted from the multiplexer 57. However, if the carry out bit is logic '1' then the sum produced by the adder 55 is greater than 255. Such a value exceeds the maximum permissible color intensity. Thus, if the carry out bit is logic '1', the multiplexer 57 selects the maximum threshold intensity.

To compute the destination color intensity Rd' in the above example, the source alpha value As divided by the maximum threshold color intensity (e.g., 256) is stored in the register 44 or 45 or inputted via line 43. Meanwhile the source color intensity, e.g. Rs, is inputted on line 41 and the current destination color intensity, e.g. Rd, is inputted on line 42. This causes Rs to be multiplied with As in multiplier 51 and Rd to be multiplied with (1–As) in multiplier 52. These two products are added together in adder 55 to produce the sum Rs·As+Rd·(1–As). The operation is similar to compute each other color intensity Gd' and Bd' or alpha intensity Ad'.

The ALU 36 has limited flexibility. In particular, the destination blend factor is always one minus the source blend factor. This requires a particular ordering of adding source objects to the destination plane of view in order to produce proper blending. (In particular, objects must be added in order from greatest "Z-buffer" value or most distant from the plane of view, to smallest "Z-buffer" value or closest to the plane of view.) This increases the complexity of the blending operation.

It is also desirable to provide for rendering 3-D objects in the presence of atmospheric of gaseous light diffusion. This is called the "fog effect." Examples of sources of the fog effect include the presence of fog and smoke. Generally speaking, the fog effect is a linear function of distance of an object image pixel from the plane of view. That is, pixels of objects close to the plane of view (pixels with small "Z-buffer" values) have color intensities which are closer to their original color with little fog color contribution. On the other hand, pixels of objects that are distant from the plane of view are obscured to a greater degree by the "fog." The color intensities of these pixels are closer to the color intensities of the fog.

The fog effect may be implemented with the following equation:

$$C = \text{FOGB\_FACTOR} \cdot C_f + (1 - \text{FOGB\_FACTOR}) \cdot C_{fc} \quad (2)$$

where C is the R, G, B or A color intensity to be determined, C. is the current R, G, B or A color intensity of an object, $C_{fc}$ is the R, G, B or A color intensity of the fog, and FOGB_FACTOR is the fog effect blend factor (which is a linear function of the Z buffer value of a pixel).

Occasionally, pixel colors are not represented in terms of the individual intensities of R, G and B. Rather, the pixels are represented in index mode. In index mode, a palette is predetermined and each color of the palette is assigned an index in a range, e.g., from 0 to 255. A pixel is then represented by a color index rather than the specific intensities of R, G and B of the color indexed by the index. In index mode, the fog effect may be implemented with the following equation:

$$I = I_i + (1 - \text{FOGB\_FACTOR}) \cdot I_{fc} \quad (3)$$

where I is the color index to be determined, $I_i$ is color index of a source object pixel and $I_{fc}$ is the color index of the fog color. (Advantageously, the fog color index is at the maximum possible index in the range of indices.)

It is an object of the present invention to increase the number of source and destination blend factors which may be selected on a pixel by pixel basis for blending. It is another object of the present invention to provide for the fog effect in rendering pixels.

SUMMARY OF THE INVENTION

These and other objects are achieved by the present invention. According to one embodiment, an apparatus is provided for blending pixels of a source object and a destination plane of view in 3-D space. The source object overlaps a destination plane of view. Furthermore, the 3-D space may contain an atmospheric light diffusion, i.e., fog or smoke, which produces a "fog effect." The apparatus includes multiplexer circuitry and calculation circuitry. The multiplexer circuitry receives first, second, third, fourth and fifth control signals. The multiplexer circuitry also receives a fog blend factor, a source alpha, a destination alpha, a source color, a destination color, a fog color and one. In response to the control signals, the multiplexer circuitry selects three outputs which are received by the calculation circuitry. In particular, in response to the first, second and third control signals, the multiplexer selects as the first output either: (1) the destination alpha, (2) the source alpha, (3) the fog blend factor, (4) one, (5) the destination color, (6) one minus the destination alpha, (7) one minus the source alpha, (8) one minus the fog blend factor, (9) zero, or (10) one minus the destination color. In response to the first, fourth and fifth control signals, the multiplexer circuitry selects as the second output either: (1) the destination alpha, (2) the source alpha, (3) the fog blend factor, (4) one, (5) the source color, (6) one minus the destination alpha, (7) one minus the source alpha, (8) one minus the fog blend factor, (9) zero, or (10) one minus the source color. In response to the first control signal, the multiplexer circuitry selects as the third output: (1) the destination color or (2) the fog color. The calculation circuitry produces a first product of the source color and the first output of the multiplexer circuitry. The calculation circuit also produces a second product of the second and third outputs of the multiplexer circuitry. The calculation circuitry then adds the two products together.

Illustratively, the multiplexer circuitry includes six multiplexers. The first multiplexer selects either the source alpha or the fog blend factor in response to the first control signal.

The second multiplexer selects either the destination alpha, the value selected by the first multiplexer, one, or the destination color in response to the second control signal. The third multiplexer selects as the first multiplexer circuitry output either the value selected by the second multiplexer or one minus the value selected by the second multiplexer in response to the third control signal. The fourth multiplexer selects either the destination alpha, the value selected by the first multiplexer, one or the source color in response to the fourth control signal. The fifth multiplexer selects as the second multiplexer circuitry output either the value selected by the fourth multiplexer or one minus the value selected by the fourth multiplexer one in response to the fifth control signal. The sixth multiplexer selects as the third multiplexer circuitry output the fog color or the destination color in response to the first control signal.

Illustratively, the calculation circuitry includes two multipliers and an adder. The first multiplier multiplies the source color with the first multiplexer circuitry output to produce the first product. The second multiplier multiplies the second multiplexer circuitry output with the third multiplexer circuitry output to produce the second product. The adder adds together the first and second products.

By appropriate generation of control signals, the blending apparatus can blend source object and destination plane of view pixels or produce the fog effect. The invention provides a larger number of inputs, i.e., blend factors and colors/alpha values, for combination in blending pixels. In particular, the source objects need not be added to the destination plane of view in strict order of decreasing distance from the plane of view. The apparatus also specifically provides for both color blending and producing the fog effect and enables easy switching between the two forms of calculations dynamically, i.e., on a pixel by pixel basis.

DETAILED DESCRIPTION OF THE INVENTION

Figure 1:
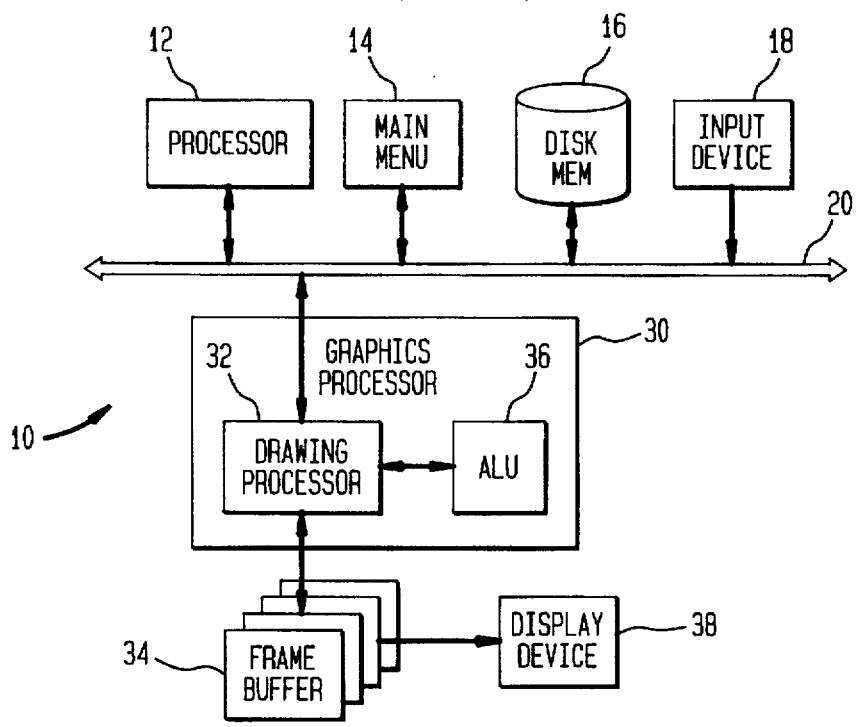
FIG. 1 depicts a conventional computer system.
Figure 2:
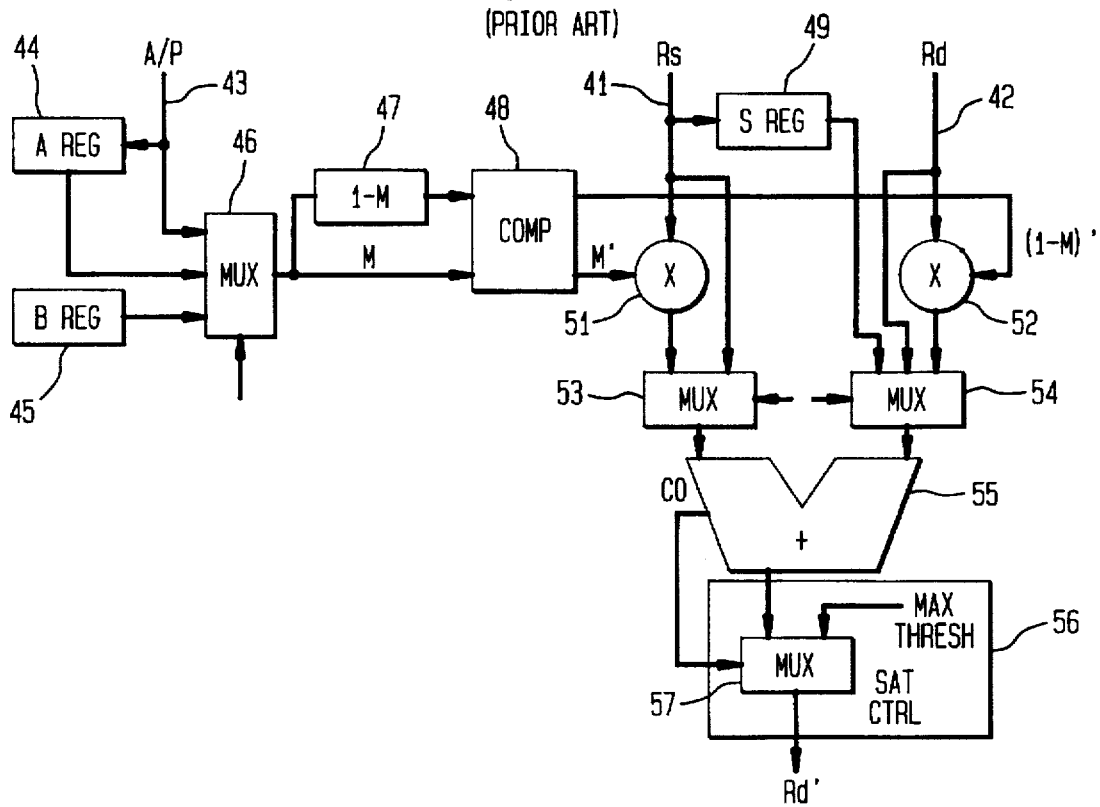
FIG. 2 depicts a conventional ALU slice in a drawing processor of the computer system shown in FIG. 1.
Figure 3:
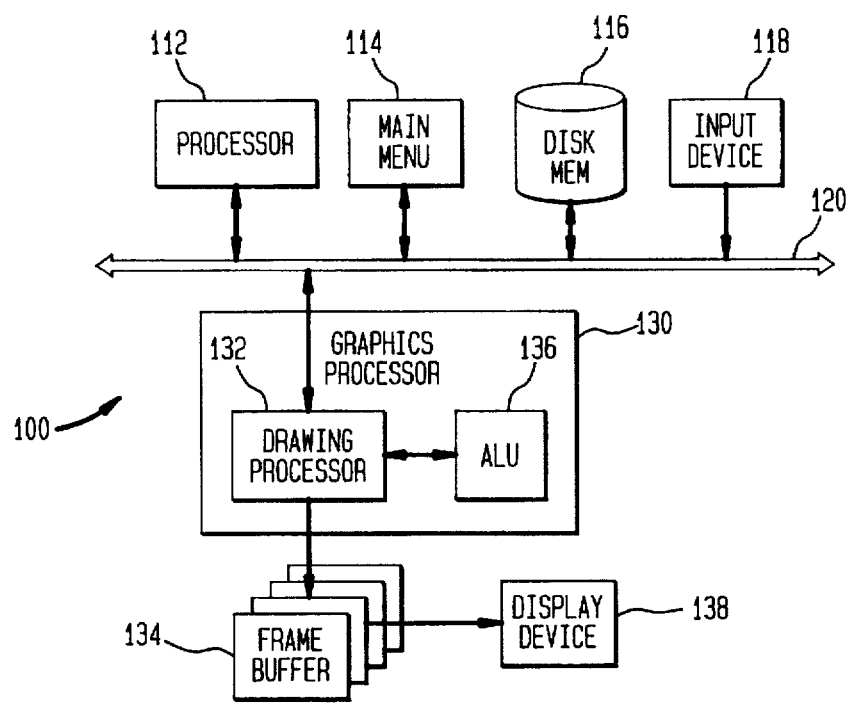
FIG. 3 depicts a computer system according to an embodiment of the present invention.

FIG. 3 depicts a computer system 100 according to an embodiment of the present invention. As before, the computer system includes a processor or CPU 112, a main memory 114, a disk memory 116, an input device 118 a bus 120, and a graphics processor 130. The graphics processor 130 includes a drawing processor 132, a frame buffer 134 and an ALU 136. A display device 138 is also connected to the frame buffer 134. As before, the drawing processor 132 receives instructions, and information (stored in the main memory 114 or disk memory 116) regarding objects in 3-D space. The drawing processor 132 renders such objects in 3-D space, i.e., draws pixel representations of the images of the objects and then combines them into a single plane of view. In combining the objects, the drawing processor 132 utilizes the ALU 136 to blend the pixels. The images thus produced are stored in frames of the frame buffer 134. The frames in the frame buffer are then displayed on the display device 138.

Figure 4:
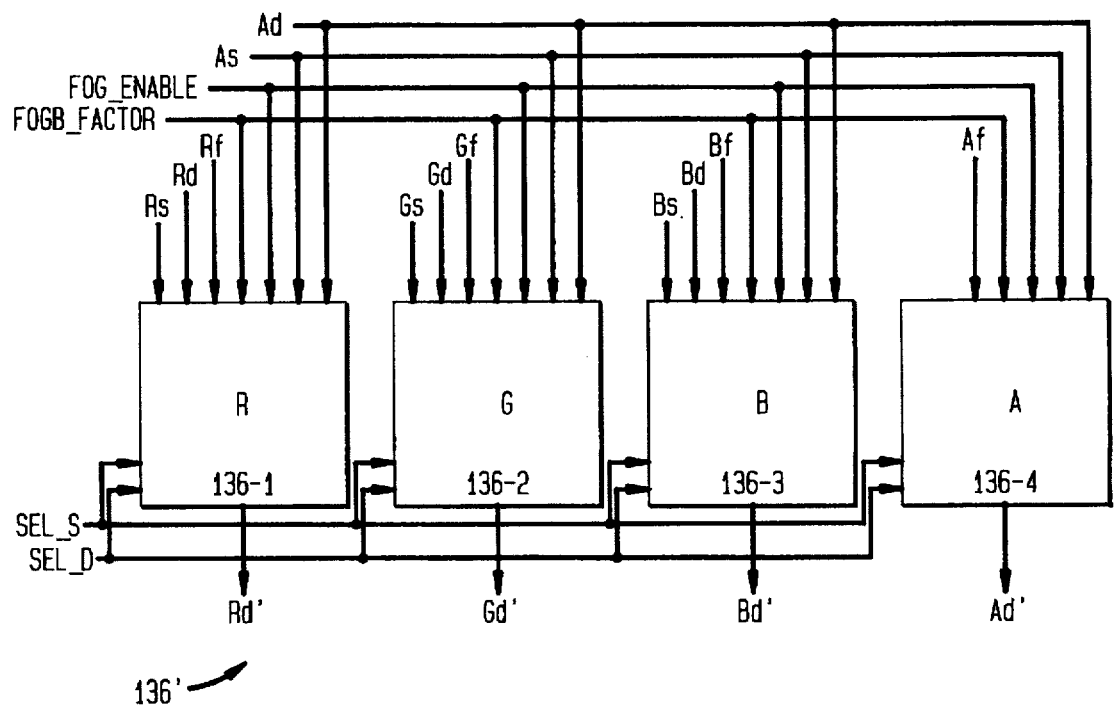
FIG. 4 depicts an ALU according to an embodiment of the present invention.

FIG. 4 depicts the ALU 136 according to an embodiment of the present invention in greater detail. As shown, the ALU 136 has four slices 136-1, 136-2, 136-3 and 136-4. One ALU slice is provided for each color R (ALU slice 136-1), G (ALU slice 136-2), and B (ALU slice 136-3) and one for A (ALU slice 136-4). This is illustrative for the case where each pixel is represented by RGBA data. Appropriate adjustment in the number of ALU slices can be made if a different number of values is used. For sake of convenience below, the discussion refers to arbitrary "colors" or "color intensities." It should be understood that such references refer to R, G, B or A, or the amplitude of such colors or alpha values.

As shown, the drawing processor 132 outputs the values Rs (source red intensity), Rd (destination red intensity), Rf (fog red intensity), Gs (source green intensity), Gd (destination green intensity), Gf (fog green intensity), Bs (source blue intensity), Bd (destination blue intensity), Bf (fog blue intensity), As (source alpha intensity), Ad (destination alpha intensity), Af (fog alpha intensity) and FOGB_FACTOR (fog blend factor). Each of the ALU slices 136-1, 136-2, 136-3 and 136-4 receives the FOGB_FACTOR. Each of the ALU slices 136-1 to 136-4 also receives As as the source alpha and Ad as the destination alpha. In the ALU slice 136-4, As and Ad are also treated as the source and destination colors. The ALU slice 136-4 also receives Af as the fog color. The ALU slice 136-1 receives Rs as the source color, Rd as the destination color and Rf as the fog color. The ALU slice 136-2 receives Gs as the source color, Gd as the destination color and Gf as the fog color. The ALU slice 136-3 receive Bs as the source color, Bd as the destination color and Bf as the fog color.

The drawing processor 132 also outputs two three bit control signals SEL_S and SEL_D and a one bit control signal FOG_ENABLE. The control signal FOG_ENABLE is set to logic '1' only in the event that the ALU 136 is used to achieve the fog effect. The signal SEL_S is used to select a source blend factor and the signal SEL_D is used to select a destination blend factor which is utilized by the ALU 136 in evaluating the equations (1a)–(1d), (2) or (3) as described below. Tables 1 and 2 summarize the source and destination blend factors that are selected by respective values of SEL_S and SEL_D:

TABLE 1

| SEL_S | Source Blend Factor |
|---|---|
| 000 | (1,1,1,1) |
| 001 | (Rd,Gd,Bd,Ad) |
| 010 | (As,As,As,As) |
| 011 | (Ad,Ad,Ad,Ad) |
| 100 | (0,0,0,0) |
| 101 | (1-Rd,1-Gd,1-Bd,1-Ad) |
| 110 | (1-As,1-As,1-As,1-As) |
| 111 | (1-Ad,1-Ad,1-Ad,1-Ad) |

TABLE 2

| SEL_D | Destination Blend Factor |
|---|---|
| 000 | (1,1,1,1) |
| 001 | (Rs,Gs,Bs,As) |
| 010 | (As,As,As,As) |
| 011 | (Ad,Ad,Ad,Ad) |
| 100 | (0,0,0,0) |
| 101 | (1-Rs,1-Gs,1-Bs,1-As) |
| 110 | (1-As,1-As,1-As,1-As) |
| 111 | (1-Ad,1-Ad,1-Ad,1-Ad) |

As descried in greater detail below, FOGB_FACTOR may be substituted for As in Tables 1 and 2.

Figure 5:
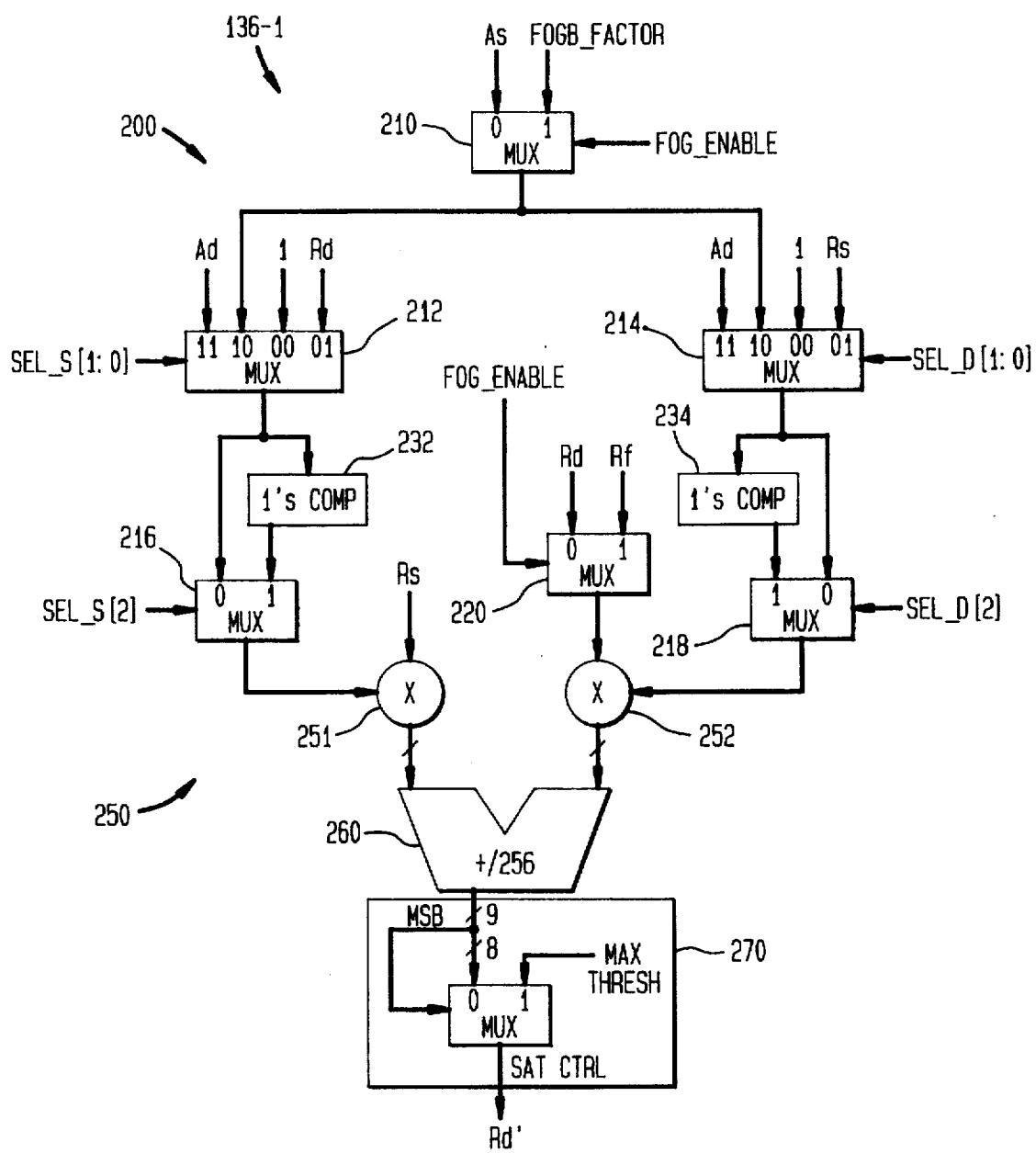
FIG. 5 depicts an ALU slice in greater detail.

FIG. 5 shows an embodiment of the ALU slice 136-1 for the color R. Each ALU slice 136-1 to 136-4 may be designed and operated in a similar fashion. Therefore, for sake of brevity, only a single ALU slice 136-1 is described. Furthermore, the invention is illustrated below wherein each color is an eight bit integer in the range of 0 to 255.

As shown, the ALU slice 136-1 includes multiplexer circuitry 200, for selecting blend factors and colors, and calculation circuitry 250, for multiplying colors and blend factors and for adding together such products to form a blended color Rd'. Illustratively, the multiplexer circuitry 200 includes six multiplexers 210, 212, 214, 216, 218 and 220. The multiplexer 210 receives As and FOGB_FACTOR as selectable inputs and FOG_ENABLE as a control signal. If FOG_ENABLE is logic '1', the multiplexer 210 selects FOGB_FACTOR. If FOG_ENABLE is logic '0', the multiplexer 210 selects As.

The multiplexer 212 receives as inputs Ad, the output of the multiplexer 210, 1 and Rd as selectable inputs and the two least significant bits of SEL_S (SEL_S[1:01]) as a control signal. If SEL_S[1:0] is logic '00', the multiplexer 212 selects 1. If SEL_S[1:01] is logic '01', the multiplexer 212 selects Rd. If SEL_S[1:0] is logic '10', the multiplexer 212 selects the output of the multiplexer 210. If SEL_S [1:01] is logic '11', the multiplexer 212 selects Ad.

The output of the multiplexer 212 is inputted to the multiplexer 216 as a selectable input. The output of the multiplexer 212 is also inputted to a 1's complement circuit 232. The output of the 1's complement circuit 232 is one minus its input. (Note that As, Ad and FOGB_FACTOR are all fractional values represented in unsigned binary. Thus, the one's complement is approximately the difference between one and such an inputted binary fractional value. The value 1 may be estimated as the binary decimal '1111 1111' which is approximately 0.9961552) The value outputted from the 1's complement circuit 232 is inputted to the multiplexer 216 as a second selectable input. The multiplexer 216 also receives the most significant bit of SEL_S (SEL_S[2]) as a control signal. If SEL_S[2] is a logic '1', the multiplexer 216 selects one minus the output of the multiplexer 212. If SEL_S[2] is logic '0', the multiplexer 216 selects the output of the multiplexer 212. The output of the multiplexer 216 serves as a first output of the multiplexer circuitry 200.

The multiplexer 214 receives as inputs Ad, the output of the multiplexer 210, 1 and Rs as selectable inputs and the two least significant bits of SEL_D (SEL_D[1:0]) as a control signal. If SEL_D[1:0] is logic '00', the multiplexer 214 selects 1. If SEL_D[1:0] is logic '01', the multiplexer 214 selects Rs. If SEL_D[1:0] is logic '10', the multiplexer 214 selects the output of the multiplexer 210. If SEL_D [1:0] is logic '11', the multiplexer 214 selects Ad.

The output of the multiplexer 214 is inputted to the multiplexer 218 as a selectable input. The output of the multiplexer 214 is also inputted to a 1's complement circuit 234. The output of the 1's complement circuit 234 is one minus its input. The value outputted from the 1's complement circuit 234 is inputted to the multiplexer 218 as a second selectable input. The multiplexer 218 also receives the most significant bit of SEL_D (SEL_D[2]) as a control signal. If SEL_D[2] is a logic '1', the multiplexer 218 selects one minus the output of the multiplexer 214. If SEL_D[2] is logic '0', the multiplexer 218 selects the output of the multiplexer 214. The output of the multiplexer 218 serves as a second output of the multiplexer circuitry 200.

The multiplexer 220 receives Rd and Rf as selectable inputs and FOG_ENABLE as a control signal. If FOG_ENABLE is a logic '0', the multiplexer 220 selects Rd. If FOG_ENABLE is a logic '1', the multiplexer 220 selects Rf. The output of the multiplexer 220 serves as a third output of the multiplexer circuitry 200.

The calculation circuitry 250 has two multipliers 251 and 252. The multiplier 251 receives as inputs the first multiplier circuitry output (outputs of multiplexer 216) and Rs. The multiplier 251 multiplies these two inputs and produces a first product. The multiplier 252 receives as inputs the second and third multiplier circuitry outputs (output of the multiplexer 218 and the multiplexer 220, respectively). The multiplier 252 multiplies these two inputs and produces a second product. Note that the multipliers 251 and 252 multiply two eight bit values to produce sixteen bit products.

The first and second products produced by the multipliers 251 and 252 are added together in the adder 260. This produces a seventeen bit sum. However, the least significant eight bits are presumed to be the fractional portion (between 0 and 1) of the sum. Hence, the adder 260 divides the sum by 256, for example, by logically shifting the sum right eight bits. Thus, a nine bit sum is outputted from the adder 260. However, nine bits is more than the eight bits permitted for each color (each color is presumed to be an eight bit integer in the range of 0 to 255). Therefore, a saturation control circuit 270 is provided for ensuring that the sum is less than the maximum permissible threshold color intensity (in this case 255). The saturation control circuit 270 has a multiplexer 275 which receives the least significant eight bits of the sum as a first selectable input. The multiplexer 275 also receives the maximum threshold permissible color intensity (255) as a second selectable input. The multiplexer 275 receives the most significant bit of the sum as a control signal. If the most significant bit is logic '0' then the sum is within the permissible range of 0 to 255. In such a case, the multiplexer 275 selects the least significant eight bits as the output Rd'. If the most significant bit of the sum is a logic '1', then the sum exceeds the maximum threshold permissible value of 255. In such a case, the multiplexer 275 selects the maximum threshold permissible value 255 as the output Rd'.

The operation of the ALU slice 136-1 is now described. Consider the case where the drawing processor 132 (FIG. 3) wishes to blend the pixels of the source object and the destination plane of view, taking into account the possible transparency effects of the source object or destination. The drawing processor 132 (FIG. 3) sets FOG_ENABLE to '0' (to disable fog effect processing), sets SEL_S to '110' and SEL_D to '010'. The multiplexer 210 selects As. The multiplexer 214 selects the output of the multiplexer 210, namely, As. The multiplexer selects one minus the output of the multiplexer 212, namely 1−As. The multiplexer 214 selects As. The multiplexer 218 selects the output of the multiplexer 214, namely, As. The multiplexer 220 selects Rd. The multiplier 251 multiplies Rs with the first multiplexer circuitry output 1−As to produce the product Rs·(1−As). The multiplier 252 multiplies the third multiplexer circuitry output Rd with the second multiplexer circuitry output As to produce the product Rd·As. The adder 260 adds these two products Rs·(1−As), and Rd·As to produce the sum Rs·(1−As) +Rd·As. The saturation control circuit 270 outputs the saturated sum Rd'=Rs·(1−As)+Rd·As.

Note that if the pixel of the source object is behind the destination pixel, the control signals SEL_S='011' and SEL_D='111' could have been used to select 1−Ad and Ad, respectively.

Consider a second case where the drawing processor 132 (FIG. 3) is to produce the fog effect. The drawing processor 132 sets FOG_ENABLE to '1', SEL_S to '010' and SEL_D to '110'. The multiplexer 210 selects FOGB_

FACTOR. The multiplexer 212 selects FOGB_FACTOR. The multiplexer 216 selects FOGB_FACTOR. The multiplexer 214 selects FOGB_FACTOR. The multiplexer 218 selects 1−FOGB_FACTOR. The multiplexer 220 selects Rf. The multiplier 251 produces the product Rs·FOGB_FACTOR and the multiplier 252 produces the product Rf·(1FOGB_FACTOR). The adder 260 outputs the sum Rs·FOGB_FACTOR+Rf·(1FOGB_FACTOR). Thus, the outputted color is Rd'=Rs·FOGB_FACTOR+Rf·(1FOGB_FACTOR).

Consider a third case where color index mode is used instead of RGBA to produce the fog effect. In such a case, the drawing processor 132 (FIG. 3) outputs the image color index $I_i$ in place of Rd and the fog color index $I_{fc}$ in place of Rf. Furthermore, the drawing processor 132 (FIG. 3) sets FOG_ENABLE to '1', SEL_S to '000' and SEL_D to '110'. The multiplexer 216 outputs 1 and the multiplexer 218 outputs 1−FOGB_FACTOR. The multiplexer 220 selects $I_{fc}$. The multiplier 251 multiplies 1 with $I_i$ to produce the product $I_i$. The multiplier 252 multiplies $I_{fc}$ with (1−FOGB_FACTOR) to produce the product $I_{fc}$·(1−FOGB_FACTOR). Thus, the outputted color index is I=$I_i$+$I_{fc}$·(1−FOGB_FACTOR). Note that only a single ALU slice 136-1 or 136-2 or 136-3 or 136-4 need be used to achieve the fog effect in color index mode.

Note that the drawing processor 132 (FIG. 3) can change the signals SEL_S, SEL_D and FOG_ENABLE on a pixel by pixel basis. No intervening cycles are needed between processing pixels to download blend factors, alpha/pattern values or colors to the ALU 136 (FIG. 3). This provides an advantage when rendering a source object that has pixels both in front of and behind pixels of the destination view. For instance, the source object may be positioned within a concave surface in the plane of view such as a gear within a cut-away crank case.

In short, a blending apparatus and method are disclosed for blending pixels of a source object with the pixels of a destination plane of view. The blending apparatus has multiplexer circuitry and control circuitry. The multiplexer circuitry responds to control signals for selecting plural different blend factors and color intensities. The calculator circuitry selectively multiplies blend factors and colors, including blend factors and colors selected by the multiplexer circuitry to blend the pixels. The multiplexer circuitry can select a wide variety of blend factors and colors to achieve both transparency/pattern blending and the fog effect. Furthermore, such blend factors can be selected on a pixel by pixel basis, without the need of intervening cycles to download blend factors, alpha/pattern values or colors.

Finally, the above discussion is intended to be illustrative of the invention. Numerous alternative embodiments may be devised by those having ordinary skill in the art without departing from the spirit and scope of the following claims.

The claimed invention is:

1. A method for blending the pixels of a source object and a destination plane of view of 3-D space comprising the steps of:

(a) in response to a first control signal, selecting either a source alpha or a fog blend factor which is a linear function of the Z buffer value of the pixels, (b) in response to a second control signal, selecting a destination alpha, the value selected in step (a), one, or a destination color, (c) in response to a third control signal, selecting the value selected in step (b) or one minus the value selected in step (b), (d) in response to a fourth control signal, selecting a destination alpha, the value selected in step (a), one, or a source color, (e) in response to a fifth control signal, selecting either the value selected in said step (d), or one minus the value selected in step (d), (f) in response to said first control signal, selecting either a fog color or a destination color, and (g) adding a first product, of said source color and the value selected in step (c), to a second product, of the value selected in step (e) and the value selected in step (f).

2. The method of claim 1 further comprising the steps of:

dividing said sum by a value depending on the maximum number of bits permitted for said destination color, and selecting the minimum of a maximum predetermined threshold or said quotient produced in said step of dividing.

3. The method of claim 1 further comprising the steps of:

selecting said source alpha in said step (a), selecting said source alpha in said step (b), selecting one minus said source alpha in said step (c), selecting said source alpha in said step (d), selecting said source alpha in said step (e), and selecting said destination color in said step (f), wherein said first product equals said source color multiplied with one minus said source blend factor, and wherein said second product equals said destination color multiplied with said source alpha.

4. The method of claim 1 further comprising the steps of:

selecting said fog blend factor in said step (a), selecting said fog blend factor in said step (d), selecting said fog blend factor in said step (e), and selecting said fog color in said step (f), wherein said second product equals said fog color multiplied with one minus said fog blend factor.

5. The method of claim 4, wherein, in an RGBA mode, said method further comprises the steps of:

selecting said fog blend factor in said step (b), selecting said fog blend factor in said step (c), wherein said first product equals said source color multiplied with said fog blend factor.

6. The method of claim 4, wherein, in a color index mode, said method further comprises the steps of:

selecting one in said step (b), selecting one in said step (c), wherein said first product equals said source color.

7. An apparatus for blending pixels of a source object and a destination plane of view of 3-D space which may contain fog, said apparatus comprising:

multiplexer circuitry, receiving first, second, third, fourth and fifth control signals, a fog blend factor which is a linear function of the Z buffer value of the pixels, a source alpha, a destination alpha, a source color, a destination color, a fog color and one, said multiplexer circuitry selecting as a first output, in response to said first, second and third control signals, said destination alpha, said source alpha, said fog blend factor, one, said destination color, one minus said destination alpha, one minus said source alpha, one minus said fog blend factor, zero, or one minus said destination color, said multiplexer circuitry selecting as a second output, in response to said first, fourth and fifth control signals, said destination alpha, said source alpha, said fog blend factor, one, said source color, one minus said destination alpha, one minus said source alpha, one minus said fog blend factor, zero, or one minus said source color, and said multiplexer circuitry selecting as a third output, in response to said first control signal, said destination color or said fog color, and calculation circuitry for adding a first product, of said source color and said first output of said multiplexer circuitry, to a second product, of said second and third outputs of said multiplexer circuitry.

8. The apparatus of claim 7 wherein said multiplexer circuitry comprises:

(a) a first multiplexer for, in response to said first control signal, selecting either said source alpha or said fog blend factor, (b) a second multiplexer for, in response to said second control signal, selecting said destination alpha, the value selected by said first multiplexer, one, or said destination color, (c) a third multiplexer for, in response to said third control signal, selecting as said first multiplexer circuitry output the value selected by said second multiplexer or one minus the value selected by said second multiplexer, (d) a fourth multiplexer for, in response to said fourth control signal, selecting said destination alpha, the value selected by said first multiplexer, one, or said source color, (e) a fifth multiplexer for, in response to said fifth control signal, selecting as said second multiplexer circuitry output the value selected by said fourth multiplexer, or one minus the value selected by said fourth multiplexer, and (f) a sixth multiplexer for, in response to said first control signal, selecting as said third multiplexer circuitry output said fog color or said destination color.

9. The apparatus of claim 8 wherein said calculation circuitry comprises:

(g1) a first multiplier for multiplying said source color with said first multiplexer circuitry output to produce said first product, (g2) a second multiplier for multiplying said second multiplexer circuitry output with said third multiplexer circuitry output to produce said second product, and (g3) an adder for adding together said first and second products.

10. The apparatus of claim 9 further comprising:

(h) a divider for dividing the sum produced by said adder by a particular value selected depending on the maximum number of bits permitted in said destination color, and (i) a scaling circuit for selecting the minimum of a predetermined maximum threshold intensity and the quotient produced by said divider.

11. The apparatus of claim 7 wherein said multiplexer circuitry selects one minus said source alpha as said first output, said source alpha as said second output and said destination color as said third output and wherein said first product equals said source color multiplied with one minus said source alpha, and wherein said second product equals said destination color multiplied with said source alpha.

12. The apparatus of claim 7 wherein said multiplexer circuitry selects one minus said fog blend factor as said second output and said fog color as said third output and wherein said second product equals said fog color multiplied with one minus said fog blend factor.

13. The apparatus of claim 12, wherein, in an RGBA mode, said multiplexer circuitry selects said fog blend factor as said first output and wherein said first product equals said source color multiplied with said fog blend factor.

14. The apparatus of claim 12, wherein, in a color index mode, said multiplexer circuitry selects one as sad first output and wherein said first product equals said source color.

15. A graphics processor comprising:

a drawing processor, for determining pixels of a source object in 3-D space, and a blending circuit for blending said pixels of said source object and pixels of a particular destination plane of view of 3-D space, which source object overlaps said particular destination plane of view of 3-D space which may contain fog, said blending circuit comprising:

multiplexer circuitry, receiving first, second, third, fourth and fifth control signals, a fog blend factor which is a linear function of the Z buffer value of the pixels, a source alpha, a destination alpha, a source color, a destination color, a fog color and one, said multiplexer circuitry selecting as a first output, in response to said first, second and third control signals, said destination alpha, said source alpha, said fog blend factor, one, said destination color, one minus said destination alpha, one minus said source alpha, one minus said fog blend factor, zero, or one minus said destination color, said multiplexer circuitry selecting as a second output, in response to said first, fourth and fifth control signals, said destination alpha, said source alpha, said fog blend factor, one, said source color, one minus said destination alpha, one minus said source alpha, one minus said fog blend factor, zero, or one minus said source color, and said multiplexer circuitry selecting as a third output, in response to said first control signal, said destination color or said fog color, and calculation circuitry for adding a first product, of said source color and said first output of said multiplexer circuitry, to a second product, of said second and third outputs of said multiplexer circuitry.

16. A computer system comprising:

a processor, a bus connected to said processor, a graphics processor connected to said bus, said graphics processor comprising:

a drawing processor, for determining pixels of a source object in 3-D space, and a blending circuit for blending said pixels of said source object and pixels of a particular destination plane of view of 3-D space, which source object overlaps said particular destination plane of view of 3-D space which may contain fog, said blending circuit comprising:

multiplexer circuitry, receiving first, second, third, fourth and fifth control signals, a fog blend factor, a source alpha, a destination alpha, a source color, a destination color, a fog color and one, said multiplexer circuitry selecting as a first output, in response to said first, second and third control signals, said destination alpha, said source alpha, said fog blend factor, one, said destination color, one minus said destination alpha, one minus said source alpha, one minus said fog blend factor, zero, or one minus said destination color, said multiplexer circuitry selecting as a second output, in response to said first, fourth and fifth control signals, said destination alpha, said source alpha, said fog blend factor, one, said source color, one minus said destination alpha, one minus said source alpha, one minus said fog blend factor, zero, or one minus said source color, and said multiplexer circuitry selecting as a third output, in response to said first control signal, said destination color or said fog color, and calculation circuitry for adding a first product, of said source color and said first output of said multiplexer circuitry, to a second product, of said second and third outputs of said multiplexer circuitry, a frame buffer connected to said graphics processor for storing pixels of said destination, and a display device for displaying said pixels stored in same frame buffer.

* * * * *